United States Patent [19]

Bowman

[11] 3,801,316

[45] Apr. 2, 1974

[54] BICHARGE ZINC OXIDE

[75] Inventor: Robert S. Bowman, Pittsburgh, Pa.

[73] Assignee: St. Joe Minerals Corporation, New York, N.Y.

[22] Filed: Jan. 29, 1973

[21] Appl. No.: 327,670

Related U.S. Application Data

[63] Continuation-in-part of Ser. No. 188,520, Oct. 12, 1971, abandoned.

[52] U.S. Cl. .................. 96/1.5, 96/1.8, 252/501
[51] Int. Cl. .................. G03g 5/00, G03g 7/00
[58] Field of Search .............. 96/1.8, 1.5; 252/501

[56] References Cited
UNITED STATES PATENTS 3,060,134  10/1962  Elder et al. .................. 96/1.8 X
3,653,895   4/1972  Brandon ...................... 96/1.8 X
3,685,989   8/1972  Galen ........................... 252/501
3,578,446   5/1971  Sugarman ..................... 96/1.8

FOREIGN PATENTS OR APPLICATIONS 41-16427   9/1966  Japan ........................... 96/1.8
41-16428   9/1966  Japan ........................... 96/1.8

Primary Examiner—Norman G. Torchin
Assistant Examiner—John L. Goodrow
Attorney, Agent, or Firm—Harold L. Stowell

[57] ABSTRACT

Conventional photoconductive zinc oxide is converted into bicharge photoconductive zinc oxide by heating with selenium in air at about 300°–600°C. Bicharge zinc oxide is particularly useful as the phtoconductive pigment in photocopy papers.

6 Claims, No Drawings

BICHARGE ZINC OXIDE

This application is a continuation-in-part of application Ser. No. 188,520, filed Oct. 12, 1971 now abandoned.

This invention relates to the production of bicharge photoconductive zinc oxide.

Photocopy papers are generally prepared by coating a system containing photoconductive zinc oxide on a paper base. Conventional (monocharge) photoconductive zinc oxides perform well in negative charge photocopying. Bicharge zinc oxide, however, can accept and discharge both negative and positive charges and can be used in the production of either negative or positive photocopy. Such dual capability adds much flexibility to the practical use of photocopy papers coated with the photoconductive zinc oxide and is particularly desirable in microfilm copying.

No commercially acceptable bicharge zinc oxide is available at present. While materials alleged to have bicharge properties have been announced, they are off-colored and do not perform well in the positive charge mode. Positive photocopies made using such materials are very low in quality and have an objectionable tan color.

I have discovered a simple, direct method for converting conventional photoconductive zinc oxide into a white (i.e., colorless), bicharge photoconductive material which, when coated on photoprint paper, provides good quality photocopy in both the negative and the positive modes. According to my method, selenium as the metal or in an oxidized form, is physically admixed with the zinc oxide and the admixture containing 0.02 to 2.0 weight percent of selenium based on zinc oxide initially present is heated in air at 300°–600°C. The residence time at temperature is selected to vaporize the selenium uniformly throughout the mass of zinc oxide. In a preferred embodiment zinc oxide and 0.1–1.0 weight percent of powdered selenium metal are heated in static air at 400°–500°C for about 10–30 minutes. The resultant bicharge product is somewhat whiter than the starting zinc oxide, and is free flowing, odorless, and possesses an oxidized surface. A similar product is obtained by heating zinc oxide in an atmosphere of gently moving air containing an equivalent quantity of selenium from an upstream source.

As mentioned above, the selenium may be provided as the metal or in an oxidized form such as selenium dioxide, selenious acid, selenic acid and other oxyacids and oxides of selenium. The selenium may also be provided as compounds of selenium, particularly with zinc, such as the selenide, selenite and selenate, oxidizable to and/or decomposable to an oxidized form of selenium under process conditions. It is noted that the selenium contents of the bicharge zinc oxide products obtained are generally 20–30 percent less than the amounts of selenium initially provided.

The method of the invention is further illustrated by means of the following non-limiting examples:

I. In static air:
 A. A 30 g. sample of conventional photoconductive zinc oxide (French process zinc oxide prepared by the air combustion of purified zinc vapor), average particle size of 0.4u, admixed with 90 mg. of selenium powder, was heated in an open, pyrex glass tube at 425°C for about 20 minutes.
 B. A 70 g. sample of zinc oxide, admixed with 342 mg. of selenous acid was heated in static air at 450°C for 20 minutes.
 C. A 70 g. sample of zinc oxide, admixed with 292 mg. selenium dioxide was heated in static air at 450°C for 20 minutes.

II. In flowing air:
 Selenium was vaporized from an upstream source heated at 400°C in a gentle stream of air. The air stream was passed through a bed of zinc oxide at 400°C.

The white product from I, (A), above, after cooling in air, was formulated into a conventional coating mixture (sensitizers, binder and solvent) of the following composition:

| | |
|---|---|
| Zinc Oxide | 50 grams |
| Thermoplastic Air-drying Resin | 14 grams (50% solids) |
| Xylol | 35 grams |
| 0.25% Uranine Dye Solution | 0.625 gram |
| 0.25% Bromophenol Blue Dye Solution | 0.625 gram |

The above mixture was coated onto a conventional, partially conductive, photocopy base paper to a dried thickness of about 0.5 mil, which corresponds to a 20 lb. coating (i.e., 20 lbs. of dried coating per 3,000 sq. ft.).

The coated sheets, at 35–40 percent relative humidity, were charged in the dark in a corona current at 40 microamperes for both − and + corona. Subsequent exposure to light was for 8 seconds at a light intensity of 20 ft. candles. The negative photo image was developed by applying a positive toner; and the positive image was developed by application of a negative or reversal toner. The quality of the photoprints was graded by visual inspection. The photoproperties of the coated papers, (charge acceptance, dark decay rate, and rate of charge decay in light) were measured and recorded electronically.

Table I illustrates the effects of initial selenium content and processing temperature on image quality of the positive charge photocopy. Image quality is scaled as follows:
 0 = non-legible
 1 = poor
 2 = fair
 3 = acceptable
 4 = good The photoprints were developed from positive charged papers coated with dye-sensitized, selenium-treated photoconductive zinc oxide prepared as described above. The coated papers were given a negative charge before positive charging.

TABLE I

| | IMAGE QUALITY | | |
|---|---|---|---|
| Wt % Se | 400°C | 450°C | 500°C |
| 0 | 0 | 0 | 0 |
| 0.1 | 1 | 1 | 1 |
| 0.2 | 3 | 3 | |
| 0.2* | 4 | | |
| 0.3 | 4 | 4 | 3 |
| 0.5 | 3 | 4 | 2 |
| 1.0 | | 2 | |

*Flowing air treatment; others static air.

It is evident that the optimum initial selenium content is in the 0.3–0.5 weight percent range with optimum processing at 400°–450°C. Image quality of the print deteriorates markedly when the initial zinc oxide processing is performed below 300°C or above 600°C.

An ideal photoconductive pigment for use in coated photocopy papers should accept a charge which would remain essentially unchanged in the dark during the period between the end of the charging cycle and the point of illumination. A high rate of dark charge decay gives rise to a relatively low charge retention at the time of illumination and, consequently a low contast, low quality photoprint.

In Table II, the dark decay rate of positive charged papers coated with dye-sensitized, selenium-treated photoconductive zinc oxide are shown as a function of their initial selenium contents and the treating conditions utilized. The coated papers were prepared as described above and given a negative charge before positive charging.

Comparison of the data in Table I with that presented in Table II shows that the improvement in positive charge print quality obtained is correlated to the resultant decrease in the rate of dark decay (i.e., charge decay after corona charging).

Further experiments illustrating the effects of selenium treatment and processing conditions on charge acceptance and image quality are tabulated below:

TABLE III

| Wt. % Selenium | Processing Temp. in Static Air °C | Charge to Coated Paper | Charge Acceptance Volts | Positive Charge Print Quality |
| --- | --- | --- | --- | --- |
| 0 | 400 | − then + | 400 / 330 | 0 |
| 0.2 | 400 | − then + | 550 / 535 | 3 |
| 0 | 450 | − then + | 580 / 505 | 0 |
| 0.2 | 450 | − then + | 590 / 635 | 3 |
| 0 | 500 | − then + | 475 / 465 | 0 |
| 0.3 | 500 | − then + | 570 / 610 | 3 |
| 0 | untreated zinc oxide | − then + | 350 / 140 | 0 |

TABLE IV

| Wt. % Selenium | Processing Atmosphere at 400°C | Post-Treatment | Color | Charge to Coated Paper | Charge Acceptance Volts | Photoprint Image Quality |
| --- | --- | --- | --- | --- | --- | --- |
| 0.2 | Static Air | None | White | − then + | 580 / 580 | 3 / 3 |
| 0.2 | Static Air | Exposed to Air At Room Temp. 5 days | White | − then + | 550 / 575 | 3 / 3 |
| 0.2 | Nitrogen | None | Buff | − then + | 50 / 40 | 0 / 0 |
| 0.2 | Nitrogen | Heated in Air At 200°C for 30 min. | Buff | − then + | 90 / 35 | 0 / 0 |
| 0.2 | Nitrogen | Exposed to Air At Room Temp. 5 days | Buff | − then + | 80 / 40 | 0 / 0 |
| 0 | Static Air | None | White | − then + | 430 / 300 | 1 / 0 |
| 0.2 (Added to previous product) | | None | Mild Grey | − then + | 445 / 210 | 1 / 0 |

TABLE II

| | DARK DECAY RATE | VOLTS/SEC | |
| --- | --- | --- | --- |
| Wt% Se | 400°C | 450°C | 500°C |
| 0 | 22 | 19 | 22 |
| 0.1 | 13 | 10 | |
| 0.2 | 9 | 9 | |
| 0.2* | 8 | | |
| 0.3 | 7 | 8 | 8 |
| 0.5 | 8 | 9 | 10 |

*Flowing air treatment; others static air.

Table III summarizes the effect of selenium treatment on charge acceptance. In each instance of selenium treatment, negative and positive charge acceptance levels were improved. Untreated zinc oxide controls (heated in static air) did not provide any legible positive photocopies; whereas the selenium-treatment products provided good quality positive photocopies.

The data in Table IV shows that processing in nitrogen was ineffective for the intended purpose. Negative and positive charge acceptance were decreased and the products were buff colored and did not yield legible positive or negative photocopy. Moreover, even when the nitrogen-processed pigment products were exposed to air at room temperature for several days, or heated in air at 200°C, the charge acceptance values were only slightly improved; formulated papers using such pigments still did not provide legible negative or positive photoprints. These findings appear contrary to the disclosures of Japanese Pat. publication Nos. 16,427/66 and 16,428/66, which teach selenium treatment in an inert or reducing atmosphere to effect improvements in zinc oxide photo-sensitivity.

The last two examples in Table IV show that heated, but selenium untreated, conventional photoconductive zinc oxide gave fair negative photoprints, but no legible positive photoprints. The addition of powdered selenium after heat treatment had no beneficial action.

The white products from I(B) and I(C) above were individually formulated as coating mixtures and applied to photocopy base paper as described herein. Both products gave good quality positive charge photocopy; their electric properties were also good, with dark decay rates of 5 and 7 volts/second, respectively. Comparable results were obtained using products wherein zinc oxide was treated with selenium in a flowing air system as in II above.

Selenium treatment of photoconductive zinc oxide according to the method of the present invention provided improved, good quality, high contrast photoprints when exposed to a negative charge and then developed into a negative photoprint. For positive photocopying, the coated paper was given a negative charge followed promptly by a positive charge, after which the positive print was developed. The use of positive charging without a prior negative charging also provided positive photoprints but image quality is slightly less.

I claim:

1. A method for producing bicharge photoconductive zinc oxide which comprises mixing photoconductive zinc oxide with 0.02-2.0 weight percent of selenium in the form of elemental selenium or as an oxide or oxyacid of selenium or a compound of selenium oxidizable or decomposable to an oxidized form of selenium under the process conditions and heating the mixture in air at 300°-600°C.

2. A method according to claim 1 wherein heating is effected at 400°-500°C in static air for 10-30 minutes.

3. A method for producing bicharge photoconductive zinc oxide which comprises mixing photoconductive zinc oxide with 0.1-1.0 weight percent of selenium in the form of elemental selenium or as an oxide or oxyacid of selenium or a compound of selenium oxidizable or decomposable to an oxidized form of selenium under the process conditions and heating the mixture in air at 400°-500°C.

4. A method for producing bicharge photoconductive zinc oxide which comprises heating selenium in a flowing air stream at 400°-500°C and passing the air stream through a bed of photoconductive zinc oxide at 400°-500°C, the air passed through the bed containing 0.02-2.0 weight percent of selenium based on the zinc oxide.

5. Colorless bicharge photoconductive zinc oxide produced by heating photoconductive zinc oxide in air at 300°-600°C in the presence of 0.02-2.0 weight percent of selenium based on the zinc oxide in the form of elemental selenium or as an oxide or oxyacid of selenium or a compound of selenium oxidizable or decomposable to an oxidized form of selenium under the process conditions.

6. Bicharge photoconductive zinc oxide suitable for negative and positive photocopy produced by heating photoconductive zinc oxide in air at 300°-600°C in the presence of 0.02-2.0 weight percent of selenium based on the zinc oxide in the form of elemental selenium or as an oxide or oxyacid of selenium or a compound of selenium oxidizable or decomposable to an oxidized form of selenium under the process conditions.

* * * * *